US009247268B2

(12) United States Patent
Francois et al.

(10) Patent No.: US 9,247,268 B2
(45) Date of Patent: Jan. 26, 2016

(54) METHOD FOR PREDICTING A BLOCK OF IMAGE DATA BY VERIFYING CONDITION RELATING TEMPORAL VARIATION BETWEEN IMAGE DATA OF REFERENCE BLOCK AND PREDICTION BLOCK OF PREVIOUS REFERENCE BLOCK, DECODING AND CODING DEVICES IMPLEMENTING SAID METHOD

(75) Inventors: Edouard Francois, Cesson-Sévigné (FR); Dominique Thoreau, Cesson-Sévigné (FR); Jerome Vieron, Cesson-Sévigné (FR)

(73) Assignee: THOMSON LICENSING, Issy les Moulineaux (FR)

( * ) Notice: Subject to any disclaimer, the term of this patent is extended or adjusted under 35 U.S.C. 154(b) by 673 days.

(21) Appl. No.: 13/138,538

(22) PCT Filed: Mar. 3, 2010

(86) PCT No.: PCT/EP2010/052657
§ 371 (c)(1),
(2), (4) Date: Dec. 31, 2011

(87) PCT Pub. No.: WO2010/100175
PCT Pub. Date: Sep. 10, 2010

(65) Prior Publication Data
US 2012/0106641 A1  May 3, 2012

(30) Foreign Application Priority Data
Mar. 6, 2009  (FR) ..................................... 09 51406

(51) Int. Cl.
*H04N 7/32*  (2006.01)
*H04N 19/573*  (2014.01)
(Continued)

(52) U.S. Cl.
CPC ........... *H04N 19/573* (2014.11); *H04N 19/105* (2014.11); *H04N 19/139* (2014.11);
(Continued)

(58) Field of Classification Search
CPC .................. H04N 19/00715; H04N 19/00727; H04N 7/26143; H04N 7/2676
USPC ..................................................... 375/240.16
See application file for complete search history.

(56) References Cited

U.S. PATENT DOCUMENTS 5,555,033 A * 9/1996 Bazzaz .................... 375/240.24
2004/0264570 A1 12/2004 Kondo et al.
(Continued)

FOREIGN PATENT DOCUMENTS

FR  2675002  10/1992
GB  2416455  1/2006
(Continued)

OTHER PUBLICATIONS

Youn et al., Proceedings of the 1999 IEEE International Symposium on Circuits and Systems, 1999. ISCAS '99. vol. 4. pp. 243-246.*
(Continued)

*Primary Examiner* — Jay Patel
*Assistant Examiner* — Francis G Geroleo
(74) *Attorney, Agent, or Firm* — Tutunjian & Bitetto, P.C.

(57) ABSTRACT

A method for predicting a current block belonging to a current image with a view to the coding or the reconstruction of the current block. The method includes determining for the current block a reference block from at least one motion data previously associated with the current block. The fulfillment of a predefined condition is is verified. The predefined condition being representative of a temporal variation between the image data of the reference block and the image data of a prediction block of the reference block previously determined from at least one motion data associated with the reference block. The motion data is modified according to the result of the verification, and a final prediction block for the current block is generated from the motion data of the current block.

12 Claims, 6 Drawing Sheets

Figure 1:
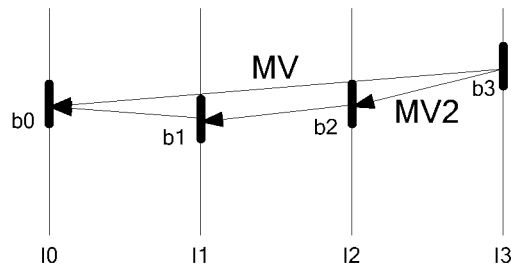

(51) Int. Cl.
*H04N 19/105* (2014.01)
*H04N 19/139* (2014.01)
*H04N 19/159* (2014.01)
*H04N 19/176* (2014.01)
*H04N 19/513* (2014.01)
*H04N 19/61* (2014.01)
*H04N 19/14* (2014.01)
*H04N 19/523* (2014.01)

(52) U.S. Cl.
CPC ............ *H04N 19/14* (2014.11); *H04N 19/159* (2014.11); *H04N 19/176* (2014.11); *H04N 19/513* (2014.11); *H04N 19/523* (2014.11); *H04N 19/61* (2014.11)

(56) References Cited

U.S. PATENT DOCUMENTS

| | | |
|---|---|---|
| 2006/0294171 A1 | 12/2006 | Bossen et al. |
| 2008/0008242 A1* | 1/2008 | Lu et al. .................... 375/240.16 |
| 2008/0256009 A1 | 10/2008 | Jiang et al. |

FOREIGN PATENT DOCUMENTS

| | | |
|---|---|---|
| WO | WO9217983 | 10/1992 |
| WO | WO2004012459 | 2/2004 |
| WO | WO2008084378 | 7/2008 |
| WO | WO2009126260 | 10/2009 |

OTHER PUBLICATIONS

Su et al., Fast Multiple Reference Frame Motion Estimation for H.264/AVC, IEEE Transactions on Circuits and Systems for Video Technology, vol. 16, No. 3, Mar. 20, 2006, pp. 447-452.

Hsieh et al.,"Fast Motion Estimation Algorithm for H.264/MPEG-4 AVC by Usng Multiple Reference Frame Skipping Criteria",Visual Comm. & Image Processing, Jul. 8, 2003,pp. 1551-1560.

Kim et al., "An Efficient Scheme for Motion Estimation using Multireference Frames in H.264/AVC", IEEE Transactions on Multimedia, vol. 8, No. 3, May 15, 2006, pp. 457-466.

Youn et al., "Motion Vector Refinement for High-Performance Transcoding", IEEE Transactions on Multimedia, vol. 1, No. 1, Mar. 1, 1999, pp. 30-40.

Wiegand et al., "Overview of the H.264/AVC Video Coding Standard", IEEE Transactions on Circuits and Systems for Video Technology, vol. 13, No. 7, Jul. 1, 2003, pp. 560-576.

Chen et al., "Fast Multiframe Motion Estimation Algorithms by Motion Vector Composition for the MPEG-4/AVC/H.264 Standard", IEEE Transactions on Multimedia, vol. 8, No. 3, May 15, 2006, pp. 478-487.

Kamp et al.,"Decoder Side Motion Vector Derivaticti for Inter Frame Video Coding", Image Processing, 2008, ICIP 2008, 15th IEEE International Conference, Oct. 12, 2008, pp. 1120-1123.

Tourapis et al., "Direct Macroblock Coding for Predictive (P) Pictures in the H.264 Standard", Visual Communications and Image Processing, San Jose, CA, Jan. 20, 2004.

Search Report Dated Jul. 13, 2010.

Youn et al., "Fast motion vector composition Method for temporal Transcoding", International Symposium on Circuits and Systems, vol. 4, 1999, pp. 243-246.

ISO IEC JTC1 SC29 WG11, "International Organisation for Standardisation Coding of Moving Pictures and Audio", MPEG-7 Audio Visual Description Profile (AVDP), Aug. 2013, Vienna, Austria, pp. 1-5.

Wiegand et al., "Joint Draft ITU-T Rec. H.264/ISO/IEC 14496-10/ Amd.3 Scalable video coding", Joint Video Team (JTV) of ISO/IEC MPEG & ITU-T VCEG, 24th Meeting, Geneva, Switzerland, Jun. 29, 2007, pp. 1-563.

Chen et al., "Motion vector optimization of control grid interpolation and overlapped block motion compensation using iterative dynamic programming", Eighth European Signal Processing Conference, Trieste, Italy, Sep. 10, 1996, pp. 1095-1098.

* cited by examiner

METHOD FOR PREDICTING A BLOCK OF IMAGE DATA BY VERIFYING CONDITION RELATING TEMPORAL VARIATION BETWEEN IMAGE DATA OF REFERENCE BLOCK AND PREDICTION BLOCK OF PREVIOUS REFERENCE BLOCK, DECODING AND CODING DEVICES IMPLEMENTING SAID METHOD

This application claims the benefit, under 35 U.S.C. §365 of International Application PCT/EP2010/052657, filed Mar. 3, 2010, which was published in accordance with PCT Article 21(2) on Sep. 10, 2010 in English and which claims the benefit of French patent application No. 0951406, filed Mar. 6, 2009.

1. SCOPE OF THE INVENTION

The invention relates to the domain of coding of image sequences and of decoding of coded data streams representative of image sequences with a view to their reconstruction.

The invention relates more specifically to a method for predicting a block of image data with a view to its coding or to its reconstruction. It also relates to a device for coding an image sequence and a device for decoding a stream of coded data representative of an image sequence that implement said method.

2. PRIOR ART

The majority of image sequence coding methods of the prior art use temporal prediction to reduce the quantity of information to be coded. Temporal prediction consists in temporally predicting a current image to be coded from other images of the sequence previously coded. Thus, the temporal prediction can be cascaded several times. This solution is shown in FIG. 1. In this figure, the block b3 is predicted from block b2, itself predicted from block b1, itself predicted from block b0.

A block is temporally predicted from another block, called the reference block, of a reference image. This reference block is identified in the image sequence by at least one motion data, for example a motion vector or a motion vector and a reference image index enabling the reference image to which the reference block belongs to be identified. Such a motion vector does not necessarily have coordinates of integer value. In the case where the motion vector coordinates are non-integer values, i.e. that they have sub-pixel precision, an interpolation filter is required to construct the prediction block, i.e. the image data of the prediction block. Such a step of filtering causes the original image data to be degraded particularly by smoothing them. The act of cascading the interpolation filtering over several temporally predicted images thus causes the original image data to be more and more smoothed (b0 in FIG. 1) and as a consequence the precision of prediction image data is reduced. This is all the more true when no residual data is coded with a view to correction of the successive predictions which occurs notably when high quantization steps are used or when the prediction signal is precise enough and does not require the residual data to be coded.

A known solution to overcome this problem consists in using a "multiple reference image" type approach such as that developed in the scope of the H.264/MPEG4 AVC standard and defined among others in section 0.6.3 of the document ISO/IEC 14496-10 or of the document ISO/IEC JTC1/SC29/WG11 and ITU-T SG16 Q.6 JVT-X201 entitled "Joint Draft ITU-T Rec. H.264|ISO/IEC 14496-10/Amd.3 Scalable video coding". Using this approach, the block b3 of FIG. 1 can be predicted directly from the block b0 of the reference image I0. However, with this solution, it is necessary to code, for each temporally predicted block, a motion vector and the reference image index enabling the image of the sequence to which this motion vector relates to be identified. In the present case, it is necessary to code for the block b3, the motion vector My and the image index I0. This solution therefore introduces an extra coding cost.

3. SUMMARY OF THE INVENTION

The purpose of the invention is to overcome at least one of the disadvantages of the prior art.

The invention relates to a method for predicting a current block belonging to a current image of an image sequence with a view to the coding or the reconstruction of the current block. Each image of the sequence comprises pixels to each of which is associated at least one image data. The method comprises the following steps:

a) determining for the current block a reference block from at least one motion data previously associated with the current block, b) verifying if a predefined condition is fulfilled, the condition being representative of a temporal variation between the image data of the reference block and the image data of a prediction block of the reference block previously determined from at least one motion data associated with the reference block, c) modifying the at least one motion data of the current block according to the result of the verification, and d) generating a prediction block for the current block from the at least one motion data of the current block.

In determining a prediction block for a current block directly, i.e. from motion data associated with the current block instead of cascading several predictions, the image data of the current block are better predicted temporally. The reconstructed data are, consequently, of better quality. In addition, by applying the method of the invention without coding any additional motion information of reference image index type, the invention enables, when it is used by a coding device, the generation of a coded image data stream at a lower bit-rate for the same reconstructed image quality. In the specific case where a reference image index is nevertheless coded, the method according to the invention remains more efficient in terms of coding efficiency than a "multiple reference image" type approach.

According to a particular characteristic of the invention, the at least one motion data of the current block is modified from the at least one motion data most generally associated with the reference block if the predefined condition is fulfilled and the at least one motion data of the current block is not modified otherwise.

According to another aspect of the invention, after step c) the reference block is replaced by a reference block determined from the at least one motion data most generally associated with the reference block and the steps b and c are repeated as long as the predefined condition is fulfilled.

According to a particular characteristic, each at least one motion data of the current block and the first reference block comprises a motion vector.

According to a variant, each at least one motion data of the current block and the first reference block also comprises a reference image index.

According to a first embodiment, the condition is fulfilled if a majority of reference block pixels are temporally predicted pixels and if a prediction error calculated between the reference block image data and the prediction block image data of the reference block is less than a predefined threshold value.

According to a second embodiment, the condition is fulfilled if in addition, a predefined proportion of the total number of pixels of said temporally predicted reference block has a single and identical associated motion data.

According to a third embodiment, the condition is fulfilled if the following in equation is also verified:

$$D(mv1/d1; mv2/d2) < \alpha$$

where:
d1 is the distance between the current image and the image of the sequence to which the reference block belongs,
d2 is the distance between the current image and the image of the sequence towards which the motion vector most generally associated with the reference block points,
mv1 is the motion vector of the current block,
mv2 is the motion vector most generally associated with the reference block, and
D is a distance function.

According to another aspect of the invention, the method comprises, prior to the step of verification, a step of determination of an intermediate reference block comprising the reference block. In the steps of verification and of modification the reference block is replaced by the intermediate reference block.

The invention also relates to a device for coding an image sequence, each image of the sequence being divided into blocks of pixels to each of which is associated at least one image data, comprising:
a motion estimation module able to determine at least one motion data for a current block of the sequence,
a motion compensation module able to determine a prediction block for the current block from at least one motion data, and
a coding module able to code a difference between the current block and the prediction block.

Advantageously, the coding device also comprises an adaptation module able to verify if a predefined condition is fulfilled, the condition being representative of a temporal variation between the image data of a reference block identified from the at least one motion data associated with the current block and the image data of a prediction block of the reference block previously determined from at least one motion data associated with the reference block by the motion estimation module and able to modify the at least one motion data of the current block according to the result of this verification.

The invention also relates to a device for decoding a stream of coded data representative of an image sequence, each image being divided into blocks of pixels each of which is associated with at least one image data, comprising:
a stream decoding module able to reconstruct for a current block residual data,
a motion data reconstruction module able to reconstruct for the current block at least one motion data,
a motion compensation module able to determine a prediction block for the current block from the at least one motion data, and
a reconstruction module able to reconstruct the current block from the prediction block and residual data.

Advantageously, the decoding device also comprises an adaptation module able to verify if a predefined condition is fulfilled, the condition being representative of a temporal variation between the image data of a reference block identified from the at least one motion data associated with the current block and the image data of a prediction block of the reference block previously determined from at least one motion data associated with the reference block by the motion data reconstruction module and able to modify the at least one motion data of the current block according to the result of this verification.

4. LIST OF FIGURES

Figure 2:
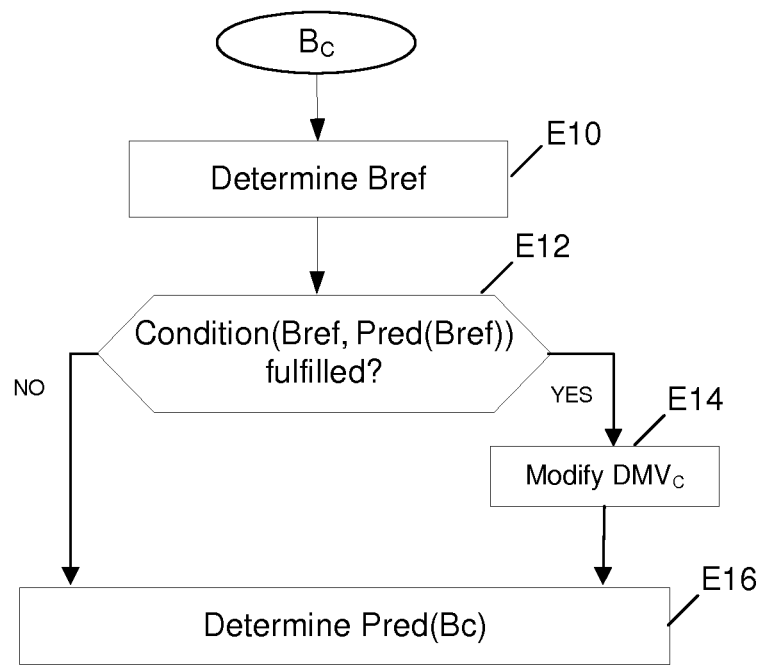
Figure 3:
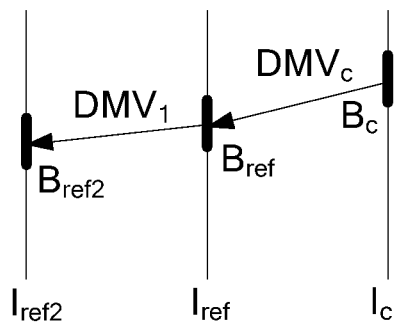
Figure 4:
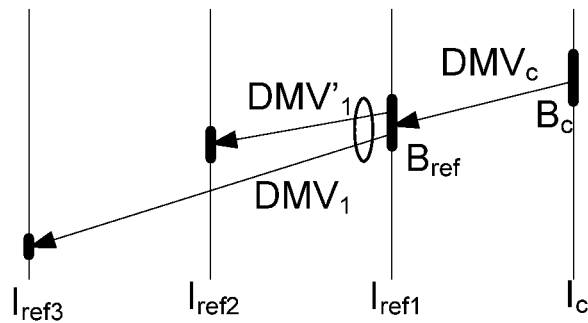
Figure 5:
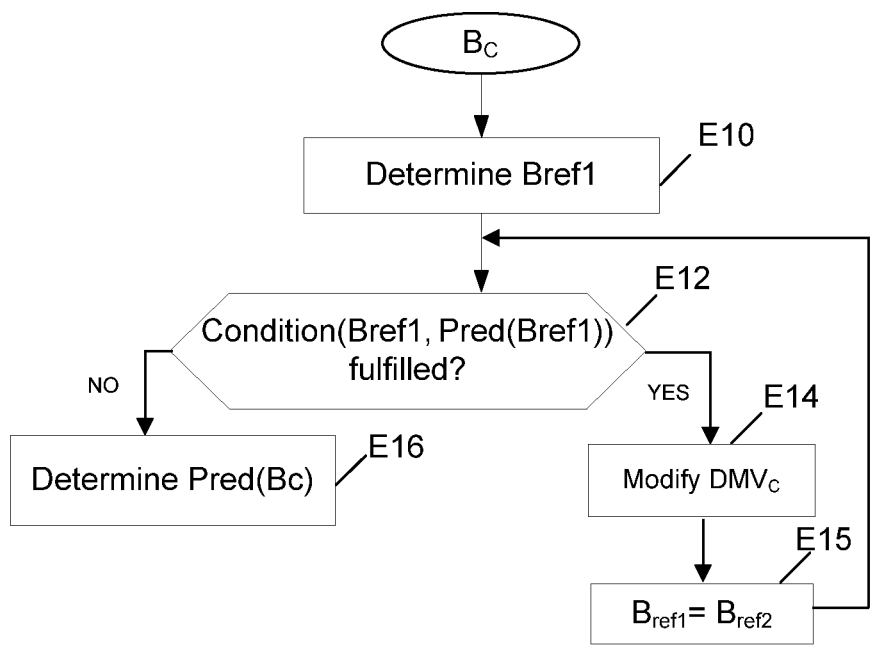
Figure 6:
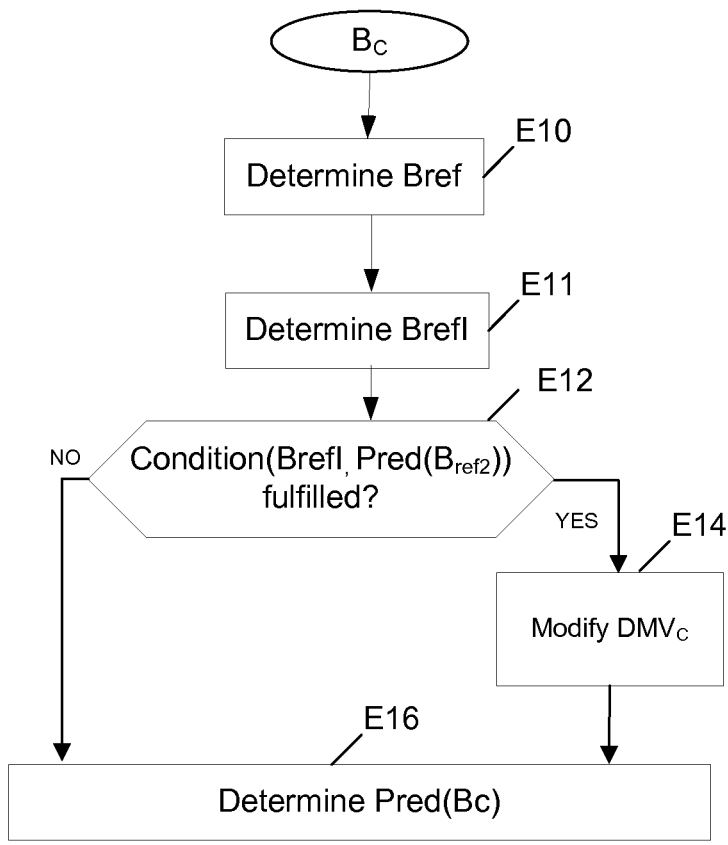
Figure 7:
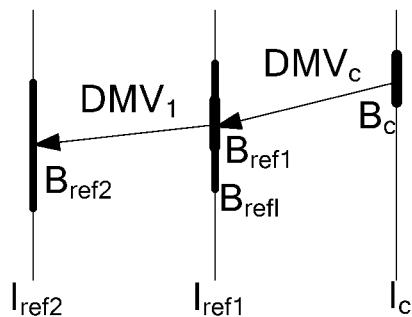
Figure 8:
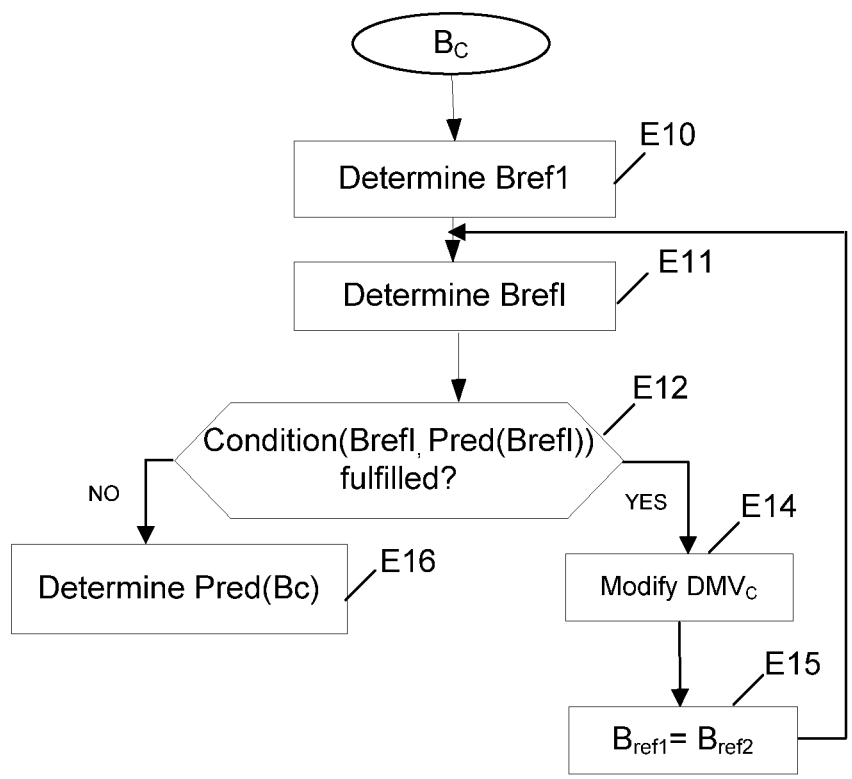
Figure 9:
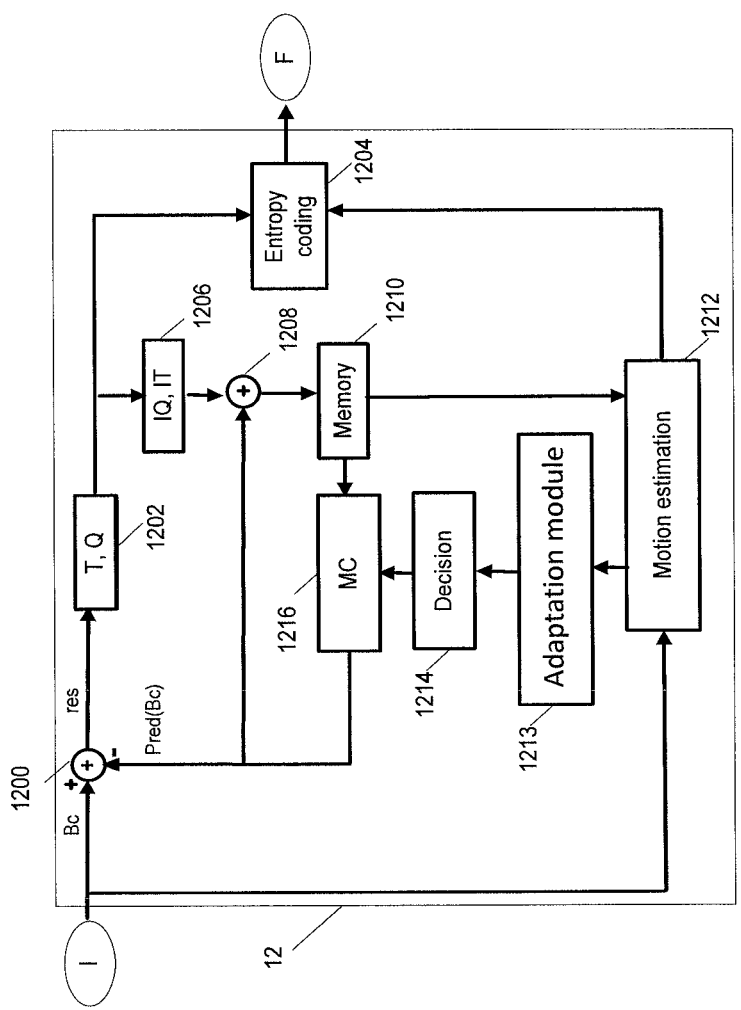
Figure 10:
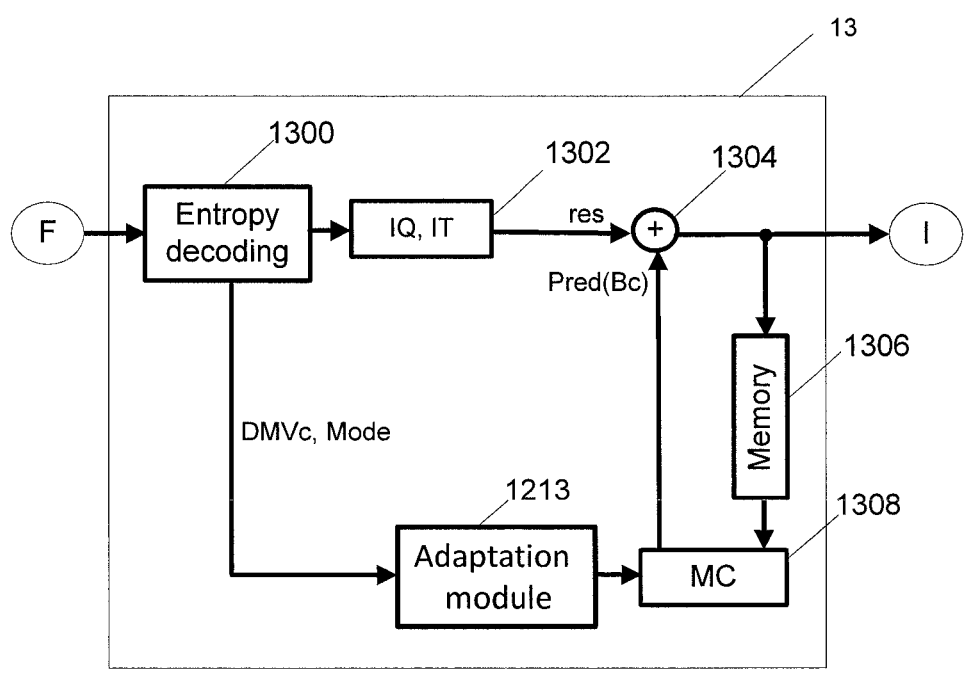

The invention will be better understood and illustrated by means of embodiments and advantageous implementations, by no means limiting, with reference to the figures in the appendix, wherein:

FIG. 1 shows a method for predicting in cascade a block of image data,

FIG. 2 shows a flowchart of a method for predicting a block of image data according to the invention, FIG. 3 shows the method for predicting a block of image data according to the invention, FIG. 4 shows the method for predicting a block of image data according to a variant of the invention, FIG. 5 shows a flowchart of a method for predicting a block of image data according to another variant of the invention, FIG. 6 shows a flowchart of a method for predicting a block of image data according to another embodiment of the invention, FIG. 7 shows the method for predicting a block of image data according to this other embodiment of the invention, FIG. 8 shows the flowchart of a method for predicting a block of image data according to a variant of this other embodiment of the invention, FIG. 9 shows a coding device according to the invention, and FIG. 10 shows a decoding device according to the invention.

5. DETAILED DESCRIPTION OF THE INVENTION

An image sequence is a series of several images. Each image comprises pixels or image points to each of which is associated at least one image data. An image data is for example a luminance data or a chrominance data. The term "coding mode" is understood as being the set of coding modes authorised by a video coding standard. Generally, they can be classed into INTRA mode, i.e. not implementing temporal prediction but possibly a spatial prediction of the block with which they are associated, and into INTER mode i.e. implementing a temporal prediction of the block with which they are associated. More generally, a block coded according to an INTER mode is called an INTER block or a block coded according to an INTRA mode is called an INTRA block.

A block of pixels can have any size including being comprised of only one pixel.

The "motion data" terms are to be understood in the widest sense. They comprise the motion vectors and possibly the reference image indexes enabling a reference image to be identified in the image sequence. They can also include illumination local variation parameters.

The "residual data" terms signify data obtained after subtraction of other data.

This term is synonymous with the term "residues". A residual block is a block of pixels with which residual data is associated.

The "prediction data" terms signify data used to predict other data. A prediction block is a block of pixels with which prediction data is associated. A residual block is for example obtained by differentiating pixel by pixel between a prediction block and a current image data block.

FIG. 2 represents a method for predicting a current block Bc of a current image Ic belonging to a sequence of several images with a view to coding or decoding the current block Bc.

At step E10, a reference block Bref shown in FIG. 3 is determined for the current block from at least one motion data DMVc previously associated with the current block Bc. The motion data DMVc comprises at least one motion vector MVc. According to a first embodiment, the reference block Bref is determined at step E10 from a motion vector MVc associated with the current block Bc and for which the coordinates are rounded to integer values. The motion vector MVc is for example obtained by a method known in the prior art such as block matching. According to this embodiment, the motion vector MVc is determined such that the prediction error calculated pixel by pixel between the current block Bc and a reference block Bref of a reference image Iref, for example the image that temporally precedes the current image, a block identified using said motion vector MVc is minimal:

$$MVc(mvx, mvy) = \operatorname*{argmin}_{Bref1 \in Iref1} \sum_{(x,y) \in Bc} (Bc(x, y) - Bref1(x + mvx, y + mvy))$$

According to a variant, the reference block Bref is determined in step E10 from two motion data, a motion vector MVc and a reference image index IDc. The motion vector and the reference image index are determined such that the prediction error calculated pixel by pixel between the current block Bc and a block Bref of a reference image Iref of a set IREF of several reference images identified using said motion vector DMVc is minimal:

$$DMVc(mvx, mvy) = \operatorname*{argmin}_{\substack{Bref \in Iref \\ Iref \in IREF}} \sum_{(x,y) \in Bc} (Bc(x, y) - Bref(x + mvx, y + mvy))$$

However the invention is in no way limited by the method for determining the motion data mentioned below. Thus, it is possible to use a pel-recursive type method to determine a motion vector or also a hierarchical motion estimation method such as that described in the patent published on Jan. 12, 2006 under the number US2006/0008005.

According to another variant, the reference block Bref is determined at the step E10 from a motion vector and possibly a reference image index previously associated with the current block Bc during the decoding of part of a coded data stream representative of the current block Bc.

At step E12, it is verified if a predefined condition has been fulfilled. This condition is representative of a temporal variation between the image data of the reference block Bref and the image data of a prediction block Pred(Bref) of the reference block Bref previously determined from at least one motion data associated with the reference block Bref. The motion data is/are associated with the reference block Bref according to one of the methods described previously in reference to the current block Bc by block matching or by any other motion estimation method, or by decoding of a part of a coded data stream representative of the reference block Bref.

If the condition is fulfilled then the method continues to step E14, if not the method continues to step E16. In this latter case, the motion data DMV$_C$ of the current block Bc is not modified.

According to a particular embodiment, the condition is fulfilled if the majority of pixels of the reference block are coded in INTER mode and if the residual data associated with these pixels in INTER mode are negligible, i.e. that they are null, that the sum of their absolute value is less than a predefined threshold or that the maximum amplitude value is less that a predefined threshold. The residual data are calculated between the reference block Bref and its prediction block or blocks Pred(Bref).

According to a first variant, the condition is fulfilled if the majority of pixels of the reference block Bref are coded in INTER mode, and if in addition the totality of pixels coded in INTER mode have the same associated motion vector MV'1 and possibly the same reference image index ID'1.

According to a second variant, the condition is fulfilled if the majority of pixels of the reference block Bref are coded in INTER mode, and if in addition a predefined proportion of the total number of pixels in INTER mode, for example at least 50% of the pixels, have the same associated motion data, i.e. same associated motion vector MV'1 and possibly the same reference image index ID'1.

According to a third variant, the condition is fulfilled if the majority of pixels of the reference block Bref are coded in INTER mode, if the residual data associated with these pixels in INTER mode is negligible, i.e. that it is null, that the sum of their absolute value is less than a predefined threshold or that the maximum amplitude value is less than a predefined threshold and if in addition a predefined proportion of the total number of pixels in INTER mode, for example at least 50% of the pixels, have the same associated motion data, i.e. the same associated motion vector MV'1 and possibly a same reference image index ID'1.

According to a fourth variant, the condition is fulfilled if the majority of pixels of the reference block Bref are coded in INTER mode, and if in addition the motion vector MV'1 most generally associated with the pixels of the reference block coded in INTER mode and the motion vector MVc are coherent, i.e. are such that D(MVc/d1; MV'l/d2)<α where:

d1 is the temporal distance between the current image and the image of the sequence to which the reference block Bref belongs, d2 is the temporal distance between the current image and the image of the sequence towards which the motion vector MV'1 most generally associated with the pixels of the reference block Bref points, and D is a distance function.

For example, D(a,b) is the L2-norm of the difference (a-b) or the amplitude of the maximum difference between the vector components.

According to a fifth variant, the condition is fulfilled if the majority of pixels of the reference block Bref are coded in INTER mode, if the residual data associated with these pixels in INTER mode are negligible, i.e. that they are null, that the sum of their absolute value is less than a predefined threshold or that the maximum amplitude value is less than a predefined threshold and if in addition the motion vector MV'1 most generally associated with the pixels of the reference block coded in INTER mode and the motion vector MVc are coherent, i.e. are such that D(MVc/d1; MV'1/d2)<α where:

d1 is the temporal distance between the current image and the image of the sequence to which the reference block Bref belongs, d2 is the temporal distance between the current image and the image of the sequence towards which the motion vector MV'1 most generally associated with the pixels of the reference block Bref points, and D is a distance function.

For example, D(a,b) is the L2-norm of the difference (a-b) or the amplitude of the maximum difference between the vector components.

According to a sixth variant, the condition is fulfilled if the majority of pixels of the reference block Bref are coded in INTER mode, if the residual data associated with these pixels in INTER mode is negligible, i.e. that it is null, that the sum of their absolute value is less than a predefined threshold or that the maximum amplitude value is less than a predefined threshold, if in addition a predefined proportion of the total number of pixels in INTER mode, for example at least 50% of the pixels, have the same associated motion data, for example the same associated motion vector and possibly the same reference image index, and if in addition the reference image index IDc identifies an image belonging to the set IREF.

These different variants can be combined to form new variants.

At step E14, the motion data $DMV_C$ of the current block $B_C$ is modified from the motion data most generally associated with the reference block Bref. In the case where several motion data noted $DMV_1$ and DMV1' are associated with the reference block Bref as shown in FIG. 4, then DMVc is modified from the motion data most generally associated with the reference block Bref.

In this case:

$$MVc=MVc+MV'1 \text{ and}$$

$$IDc=ID'1.$$

The particular case, shown in FIG. 3 is possible in the case where the block Bref covers pixels belonging to blocks of pixels with which are associated different motion data and possibly different reference images. In FIG. 3, the motion data DMV1 (MV'1, ID'1) are associated with the pixels situated at the top of the reference block Bref, while the motion data DMV1 (MV1, ID1) are associated with the pixels situated at the bottom of the reference block Bref. Moreover, a majority of pixels of the reference block Bref have as motion data DMV'1, this is why DMVc is modified from motion data most generally associated with the reference block Bref, i.e. DMV1 (MV'1, ID'1).

At step E16, a prediction block is determined for the current block Bc from DMVc possibly modified in step E14.

This approach enables Bc to be predicted directly from the image data of Iref2 while coding only the initial motion data DMVc, i.e. without coding the reference image index ID'1 associated with the image Iref2. In reference to FIG. 1, this embodiment advantageously enables the block b3 to be directly predicted and therefore coded from image data of I1 by coding only the motion vector MV2 and notably without coding a reference image index able to identify the image 11.

FIG. 5 represents a method for predicting a current block Bc of a current image Ic belonging to a sequence of several images with a view to coding or decoding the current block Bc according to a particularly advantageous embodiment of the invention. In this figure the steps identical to those of the embodiment described in reference to FIG. 2 are identified using the same numerical references and are not described further.

At step E10, a first reference block Bref1 is determined for the current block from at least one motion data DMVc previously associated with the current block Bc. DMVc comprises at least one motion vector MVc for which the coordinates are rounded to integer values to determine the first reference block Bref1.

At step E12, it is verified if a predefined condition has been fulfilled. This condition is representative of a temporal variation between the image data of the first reference block Bref1 and the image data of a prediction block Pred(Bref1) of the first reference block Bref1 previously determined from at least one motion data associated with the first reference block Bref1. If the condition is fulfilled then the method continues to step E14, if not the method is continued at step E16. In this latter case, the motion data $DMV_C$ of the current block Bc is not modified.

At step E14, the motion data $DMV_C$ of the current block $B_C$ is modified from the motion data $DMV_1$ most generally associated with said first reference block Bref1.

At step E15, the first reference block Bref1 is replaced by a second reference block Bref2, i.e. the block identified in a reference image from the motion data most generally associated with the first reference block Bref1, and the steps E12 to E15 are reiterated until the predefined condition is no longer fulfilled.

At step E16, a prediction block is determined for the current block Bc from the motion data DMVc possibly modified in step E14.

In reference to FIG. 1, this embodiment advantageously enables the block b3 to be directly predicted and therefore coded from image data of I0 by coding only the motion vector MV2 and notably without coding a reference image index able to identify the image I0.

FIG. 6 shows a method for determining a motion data DMVc for a current block Bc of a current image Ic belonging to a sequence of several images according to another particularly advantageous embodiment of the invention. In this figure the steps identical to those of the embodiment described in reference to FIG. 1 are identified using the same numerical references and are not described further.

At step E10, a reference block Bref is determined for the current block from at least one motion data DMVc previously associated with the current block Bc.

In step E11, an intermediate reference block Brefl is determined that comprises the reference block Bref determined in step E10. This step enables the method for prediction to be improved and particularly enables the size of the interpolation filter possibly used for the temporal prediction in step E16 to be taken into account. According to a particular embodiment, (Sx, Sy) are the dimensions of the reference block Bref determined in step E10, (dx,dy) are the integer part coordinates of the motion vector MVc associated with the current block Bc, (px, py) are fractional part coordinates of the motion vector MVc. Thus the coordinates of MVc are equal to dx+px and to dy+py. The dimensions of the intermediate block Brefl are then set at (Sx+wx, Sy+wy), where (wx, wy) represent the size of the horizontal respectively vertical interpolation filter supports associated with the fractional parts (px, py)

According to a variant, the data (Sx, Sy) can be increased at each iteration by positive values ux and uy. This solution enables account to be taken of the uncertainty generated by the cumulative prediction method: Sx=Sx+ux and Sy=Sy+uy.

At step E12, it is verified if a predefined condition has been fulfilled. This condition is representative of a temporal variation between the image data of the reference block Brefl and the image data of a prediction block Pred(Bref) of the reference block Brefl previously determined from at least one motion data associated with the reference block Brefl. If the condition is fulfilled then the method continues to step E14, if not the method is continued at step E16. In this latter case, the motion data $DMV_C$ of the current block Bc is not modified.

At step E14, the motion data $DMV_C$ of the current block $B_C$ is modified from the motion data $DMV_1$ most generally associated with the reference block Brefl.

At step E16, a prediction block is determined for the current block Bc from the motion data DMVc possibly modified in step E14.

Thus in FIG. 7, the block Brefl encompasses the block Bref.

FIG. 8 shows a method for determining a motion data DMVc for a current block Bc of a current image Ic belonging to a sequence of several images according to another particularly advantageous embodiment of the invention. In this figure the steps identical to those of the embodiment described in reference to FIG. 6 are identified using the same numerical references and are not described further.

At step E10, a reference block Bref shown in FIG. 3 is determined for the current block from at least one motion data DMVc previously associated with the current block Bc.

In step E11, an intermediate reference block Brefl is determined that comprises the reference block Bref determined in step E10. This step enables the method for prediction to be improved and particularly enables the size of the interpolation filter possibly used for the temporal prediction in step E16 to be taken into account. According to a particular embodiment, (Sx, Sy) are the dimensions of the reference block Bref determined in step E10, (dx,dy) are the integer part coordinates of the motion vector MVc associated with the current block Bc, (px, py) are fractional part coordinates of the motion vector MVc. Thus the coordinates of MVc are equal to dx+px and to dy+py. The dimensions of the intermediate block Brefl are then set at (Sx+wx, Sy+wy), where (wx, wy) represent the size of the horizontal respectively vertical interpolation filter supports associated with the fractional parts (px, py) According to a variant, the data (Sx, Sy) can be increased at each iteration by positive values ux and uy. This solution enables account to be taken of the uncertainty generated by the cumulative prediction method: Sx=Sx+ux and Sy=Sy+uy.

At step E12, it is verified if a predefined condition has been fulfilled. This condition is representative of a temporal variation between the image data of the reference block Brefl and the image data of a prediction block Pred(Bref) of the reference block Brefl previously determined from at least one motion data associated with the reference block Brefl. If the condition is fulfilled then the method continues to step E14, if not the method continues to step E16. In this latter case, the motion data $DMV_C$ of the current block Bc is not modified.

At step E14, the motion data $DMV_C$ of the current block $B_C$ is modified from the motion data $DMV_1$ most generally associated with said first reference block Brefl.

At step E15, the first reference block Brefl is replaced by a second reference block Bref2, i.e. the block identified in a reference image from the motion data most generally associated with the first reference block Brefl, and the steps E12 to E15 are reiterated until the predefined condition is no longer fulfilled.

At step E16, a prediction block is determined for the current block Bc from the motion data DMVc possibly modified in step E14.

The invention also relates to a coding device 12 described with reference to FIG. 9. The coding device 12 receives at input images I belonging to an image sequence. Each image is divided into blocks of pixels to each of which is associated at least one image data. The coding device 12 notably implements a coding with temporal prediction. Only the modules of the coding device 12 relating to the coding by temporal prediction or INTER coding are shown in FIG. 12. Other modules not shown and known by those skilled in the art of video coders implement the INTRA coding with or without spatial prediction. The coding device 12 notably comprises a calculation module 1200 able to subtract from a current block Bc a prediction block Pred(Bc) pixel by pixel to generate a residual image data block or residual block noted as res. It also comprises a module 1202 able to transform then quantize the residual block res into quantized data. The transform T is for example a Discrete Cosine Transform (DCT). The coding module 12 further comprises an entropy coding module 1204 able to code the quantized data into a stream F of coded data. It also comprises a module 1206 carrying out the inverse operation of module 1202. The module 1206 carries out an inverse quantization IQ followed by an inverse transform IT. The module 1206 is connected to a calculation module 1208 able to add pixel by pixel the block of data from the module 1206 and the prediction block Pred(Bc) to generate a block of reconstructed image data that is stored in a memory 1210. The coding device 12 also comprises a motion estimation module 1212 able to estimate at least one motion vector between the block Bc and a reference image stored in the memory 1210, this image having previously been coded then reconstructed. According to a variant, the motion estimation can be carried out between the current block Bc and the original reference image in which case the memory 1210 is not connected to the motion estimation module 1212. According to a method well known to those skilled in the art, the motion estimation module 1212 searches in the reference image for a motion vector in such a way as to minimize an error calculated between the current block Bc and a reference block Bref in the reference image identified by means of said motion vector.

The motion data are transmitted by the motion estimation module 1212 to an adaptation module 1213 able to verify if a predefined condition has been fulfilled, said condition being representative of a temporal variation between the image data of the reference block Bref and the image data of a prediction block Pred(Bref) of the reference block Bref previously determined from at least one motion data associated with the reference block. The adaptation module 1213 is also able to modify the motion data of the current block Bc to be coded according to this verification. The adaptation module 1213 is notably able to implement steps E10 to E16 of the prediction method according to one of the embodiments described in reference to FIGS. 2 to 7.

The coding device 12 also comprises a decision module 1214 able to select a coding mode for the block Bc in a coding mode predefined set. The coding mode retained is for example the one that minimizes a rate-distortion type criterion. However, the invention is not restricted to this selection method and the mode retained can be selected according to another criterion for example an a priori type criterion. The coding mode selected by the decision module 1214 as well as the motion data, for example the motion vector or motion vectors in the case of the temporal prediction mode or INTER mode are transmitted to a motion compensation module 1216. The motion vector or motion vectors and the selected coding mode are also transmitted to the entropy coding module 1204 to be coded in the stream F. The motion compensation module 1216 then determines in the reference image Ir previously reconstructed and stored in the memory 1210, the prediction block Pred(Bc) from the motion data DMVc possibly modified by the adaptation module 1213 and the coding mode decoded for the current block Bc by the entropy decoding module 1300. The modules 1200, 1202, 1204, 1206, 1210 and 1214 forming a group of modules called the coding module The invention also relates to a decoding device 13 described in reference to FIG. 10. The decoding module 13 receives at input a stream F of coded data representative of an image sequence. The stream F is for example transmitted by a coding device 12. The decoding device 13 comprises an entropy decoding module 1300 able to generate decoded data, for example coding modes and decoded data relating to the content of the images.

The decoding device 13 also comprises a motion data reconstruction module. According to a first embodiment, the motion data reconstruction module is the entropy decoding module 1300 that decodes a part of the stream F representative of said motion vectors.

According to a variant not shown in FIG. 13, the motion data reconstruction module is a motion estimation module. This solution for reconstructing motion data via the decoding device 13 is known as "template matching".

The decoded data relating to the content of the images is then transmitted to a module 1302 able to carry out an inverse quantization followed by an inverse transform. The module 1302 is identical to the module 1202 of the coding module 12 that generated the coded stream F. The module 1302 is connected to a calculation module 1304 able to add pixel by pixel the block from the module 1302 and a prediction block Pred (Bc) to generate a block of reconstructed image data that is stored in a memory 1306. The decoding device 13 also comprises an adaptation module 1213 able to verify if a predefined condition has been fulfilled, said condition being representative of a temporal variation between the image data of the reference block Bref and the image data of a prediction block Pred(Bref) of the reference block Bref previously determined from at least one motion data associated with the reference block. The adaptation module 1213 is also able to modify the motion data of the current block Bc to be reconstructed according to this verification. The adaptation module 1213 is notably able to implement steps E10 to E16 of the prediction method according to one of the embodiments described in reference to FIGS. 2 to 7.

The decoding device 13 also comprises a motion compensation module 1308 identical to the module 1216 of the coding device 12. The motion compensation module 1308 then determines in a reference image previously reconstructed and stored in the memory 1306, the prediction block Pred(Bc) from the motion data DMVc possibly modified by the adaptation module 1213 and the coding mode decoded for the current block Bc by the entropy decoding module 1300.

The modules 1302, 1304, 1306 form a group of modules called the reconstruction module.

The invention claimed is:

1. The prediction method for a current block belonging to a current image of a sequence of images with a view to the coding or the reconstruction of said current block, each image of said sequence comprising pixels to each of which is associated at least one image data, said method comprising the following steps:
a) determining for the current block a reference block from at least one current motion vector and one current reference index associated with said current block,
b) verifying if the following conditions are fulfilled:
a majority of pixels of said reference block are temporally predicted pixels,
a prediction error calculated between the image data of said reference block and the image data of a prediction block of said reference block is less than a predefined threshold value, and
the following inequality is verified:

$D(mv1/d1; mv2/d2) < \alpha$ where:
d1 is the distance between the current image and the image of the sequence to which the reference block belongs,
d2 is the distance between the current image and the image of the sequence towards which the motion vector associated with said majority of pixels of said reference block,
mv1 is the motion vector of said current block,
mv2 is the motion vector associated with a majority of pixels of said reference block,
D is a distance function; and
α is a threshold value;
c) when said conditions are fulfilled, adding to said at least one current motion vector a motion vector associated with a majority of pixels of said reference block and modifying said current reference index with the reference index associated with said majority of pixels of said reference block, and
e) generating a prediction block for said current block from said at least one current motion vector and from said current reference index.

2. The method of claim 1, wherein said method further comprises, after step c), a step d) of replacing said reference block by a reference block determined from said motion vector and reference index associated with said majority of pixels of said reference block and wherein the steps b, c and d are repeated as long as said conditions are fulfilled.

3. The method of claim 1, wherein the conditions are fulfilled if in addition a predefined proportion of the total number of pixels of said reference block have an identical associated motion vector and an identical associated reference index.

4. The method of claim 1, which further comprises, before the verification step, a step of determination of an intermediate reference block comprising said reference block and wherein, in the steps of verification and of addition said reference block is replaced by said intermediate reference block.

5. A device for coding a sequence of images, each image of said sequence being divided into blocks of pixels to each of which is associated at least one image data, comprising:
a motion estimation module for determining at least one current motion vector and one current reference index for a current block of said sequence,
a motion compensation module for determining a prediction block for said current block from said at least one current motion vector and from said current reference index,
a coding module for coding a difference between said current block and said prediction block,
said coding device further comprising an adaptation module for verifying if the following conditions are fulfilled:
a majority of pixels of a reference block are temporally predicted pixels,
a prediction error calculated between the image data of said reference block and the image data of a prediction block of said reference block is less than a predefined threshold value, said reference block being identified from said at least one current motion vector, and
the following inequality is verified:

$D(mv1/d1; mv2/d2) < \alpha$ where:
d1 is the distance between the current image and the image of the sequence to which the reference block belongs, d2 is the distance between the current image and the image of the sequence towards which the motion vector associated with said majority of pixels of said reference block, mv1 is the motion vector of said current block, mv2 is the motion vector associated with a majority of pixels of said reference block, D is a distance function; and α is a threshold value;

when the conditions are fulfilled, for adding to said at least one current motion vector a motion vector associated with a majority of pixels of said reference block and for modifying said current reference index with the reference index associated with said majority of pixels of said reference block.

6. The device of claim 5, wherein the adaptation module is further configured to replace said reference block by a reference block determined from said motion vector and reference index associated with said majority of pixels of said reference block after said conditions are fulfilled, and wherein verifying, adding, and replacing are repeated as long as said conditions are fulfilled.

7. The device of claim 5, wherein the adaptation module is further configured to verify if the conditions are fulfilled, wherein the conditions are fulfilled if in addition a predefined proportion of the total number of pixels of said reference block have an identical associated motion vector and an identical associated reference index.

8. The device of claim 5, wherein the adaptation module is further configured to determine an intermediate reference block comprising said reference block before verification, and replace said reference block by said intermediate reference block in verification and of addition.

9. A decoding device of a stream of coded data representative of a sequence of images, each image being divided into blocks of pixel each of which is associated with at least one image data, comprising:

a decoding module of said stream for reconstructing residual data for a current block, a motion data reconstruction module for reconstructing for said current block at least one current motion vector and a current reference index, a motion compensation module for determining a prediction block for said current block from said at least one motion vector and from said current reference index, a reconstruction module for reconstructing said current block from said prediction block and residual data, said decoding device further comprising an adaptation module for verifying if the following conditions are fulfilled:

a majority of pixels of a reference block are temporally predicted pixels, a prediction error calculated between the image data of said reference block and the image data of a prediction block of said reference block is less than a predefined threshold value, said reference block being identified from said at least one current motion vector, and the following inequality is verified:

$$D(mv1/d1; mv2/d2) < \alpha$$

where:

d1 is the distance between the current image and the image of the sequence to which the reference block belongs, d2 is the distance between the current image and the image of the sequence towards which the motion vector associated with said majority of pixels of said reference block, mv1 is the motion vector of said current block, mv2 is the motion vector associated with a majority of pixels of said reference block, D is a distance function; and α is a threshold value;

when the conditions are fulfilled, for adding to said at least one current motion vector a motion vector associated with a majority of pixels of said reference block and for modifying said current reference index with the reference index associated with said majority of pixels of said reference block.

10. The decoding device of claim 9, wherein the adaptation module is further configured to replace said reference block by a reference block determined from said motion vector and reference index associated with said majority of pixels of said reference block after said conditions are fulfilled, and wherein verifying, adding, and replacing are repeated as long as said conditions are fulfilled.

11. The decoding device of claim 9, wherein the adaptation module is further configured to verify if the conditions are fulfilled, wherein the conditions are fulfilled if in addition a predefined proportion of the total number of pixels of said reference block have an identical associated motion vector and an identical associated reference index.

12. The decoding device of claim 9, wherein the adaptation module is further configured to determine an intermediate reference block comprising said reference block before verification, and replace said reference block by said intermediate reference block in verification and of addition.

* * * * *